July 29, 1924.

W. H. SILVER

WHEEL HUB

Filed May 19, 1919

1,502,920

Witness,
William J. Morris.

Inventor
Walter H. Silver
W. C. Jirdrustru
Attorney

Patented July 29, 1924.

1,502,920

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

WHEEL HUB.

Application filed May 19, 1919. Serial No. 298,231.

*To all whom it may concern:*

Be it known that WALTER H. SILVER, a citizen of the United States, residing at Moline, in the county of Rock Island and State of Illinois, has invented certain new and useful Improvements in Wheel Hubs, of which the following is a specification, reference being had therein to the accompanying drawing.

My invention relates to wheel hubs and the particular means employed to secure an axle within a hub, providing at the same time an efficient means of lubrication and protection of the bearing parts from dust.

Objects of the invention are to provide a construction which may be produced without costly manufacturing processes, which may be readily assembled for delivery to the user, and which will securely retain the wheel in position.

Further objects of the invention are to ensure satisfactory lubrication for the parts of the device, at which the greatest friction is produced; to positively exclude dust and grit, and to permit the ready removal of the wheel or of parts of the hub construction for replacement, lubrication or adjustment.

Other objects of the invention will become apparent as the description proceeds in connection with a preferred embodiment thereof disclosed in the accompanying drawings.

Referring to the drawings in which similar numerals indicate identical parts—

Figure 1:
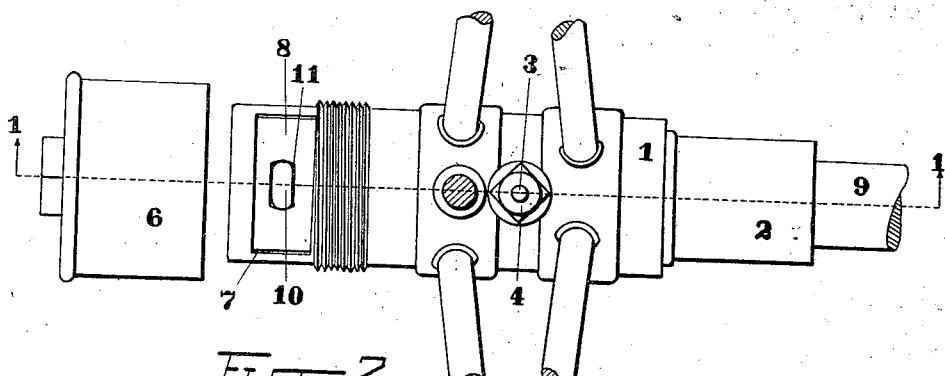
Figure 1 is a plan view of a hub embodying my improvements.
Figure 2:
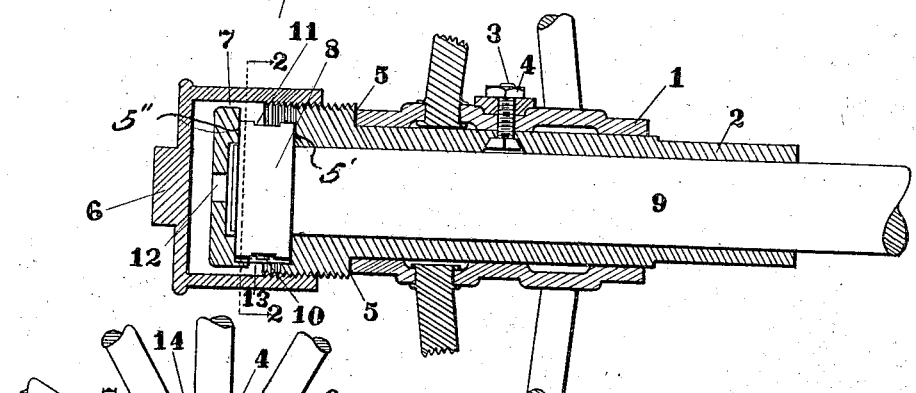
Figure 2 is a longitudinal section on the line 1—1 of Figure 1.
Figure 3:
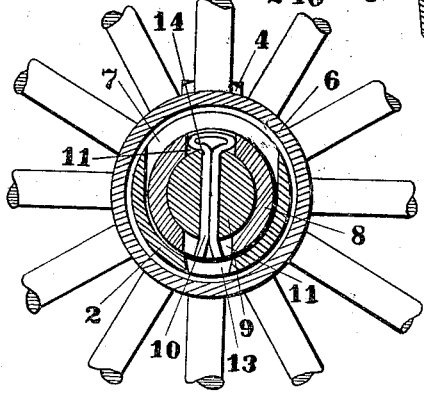
Figure 3 is a cross section on the line 2—2 of Figure 2.

The hub is preferably metallic and comprises a shell 1, to which the spokes are secured, and a bearing box or sleeve 2 within the shell 1 and fastened therein by a bolt 3 the head of which fits in a countersink in the inner face of the box 2, the stem passing through the wall of the box 2 and the shell 1; a nut 4 on the stem secures the bolt in position and the box 2 and shell 1 firmly together. The box 2 extends beyond each end of the shell 1, its outer end being enlarged to a greater diameter than the shell 1, forming a shoulder 5 to fit snugly against the adjacent end of the shell 1. From this point, for a portion of its length, the enlarged portion of the box 2 is threaded for reception of a cap 6.

The enlarged end of the box or sleeve 2 has positioned therein suitable means for locking the sleeve against movement in either direction longitudinally of an axle spindle. In the present instance a collar 8, which may be inserted through a radial recess 7 is positioned within the sleeve and surrounds the end of the axle spindle 9. Internal shoulders 5', 5", within the sleeve, serve to engage the collar on its opposite sides, the latter being held against movement longitudinally of the axle spindle by means of a suitable pin or cotter 10; diametrically opposed openings 11 in the collar permit the latter to be inserted through an opening 14 in the axle spindle 9, and the length of the same is preferably such that it will not project beyond the circumference of the collar 8, so as not to interfere with the rotation of the sleeve 2.

It should be noted that the spindle 9 of the axle is merely a continuation of ordinary round axle stock. The spindle portion has no annular grooves, nor is it forged or turned in a lathe to form a thrust shoulder. That is to say, the spindle itself is normally adapted to permit the sleeve 2 and collar 8 to move longitudinally thereof. The collar 8 fits loosely within the internal groove of the sleeve 2 between the shoulders 5', 5", permitting slight longitudinal movement of the sleeve along the axle but limiting this movement. It should further be noted that the collar is located adjacent the end of the axle spindle which is desirable, since in most instances the spindle is inclined with the outer end lowermost, causing the lubricant naturally to gravitate to this point. The cap 6, which retains the grease serves to close the radial openings in the sleeve 2, as well as the end of the sleeve, and as it is a container for the lubricant proper lubrication is provided at the end of the axle around the collar where the thrusts are carried. Moreover, due to the fact that the cap 6 closes the openings in the sleeve, it is impossible for the cotter pin 14 to become accidentally dislodged, since it is only through the recess 7 that the same can be removed.

When the parts are assembled, as described, the cap 6 is filled with grease, placed in position over the end of the box 2 until the interior thread of the cap 6 registers with the threaded surface of the box 2, and then turned forcing the lubricant into the recess 7 not only through the opening thereof, through which the collar 8 is inserted, but through openings 12 and 13 in the box, the opening 13 being also utilizable for the insertion of a punch, or other suitable tool, by the operation of which the cotter can be removed. The collar 8 is sufficiently loose in the recess 7 and on the axle spindle 9 to permit the grease to spread the length of the box 2 by rotation thereof, it being evident the degree of pressure upon the grease is regulated by turning the cap 6, the fitting of the latter upon the box 2 preventing wastage and at the same time protecting the various parts of my device from dust.

It will be noted that accuracy and speed in assembling and disassembling the parts is materially increased by having the outer end of the sleeve or box 2 in the longitudinal lines of the collar 8 closed, so that when the hub is mounted upon the spindle its inward movement is checked and the parts are in proper position for insertion of the cotter 10 to hold them together. No means other than the collar 8 and cotter are employed to limit the movement of the hub longitudinally of the spindle. In removing the wheel it is simply necessary to detach the cap 6 and the cotter may then be displaced by the insertion of a punch or other suitable tool in the opening 13. When the cotter is removed the hub may be moved outwardly on the spindle. If desired, the collar 8 may be taken from the box through the recess 7 provided for this purpose.

It should be understood that the invention is not limited to the precise details of the construction illustrated and described, but that such modifications may be made as come within the meaning of the following claims without departing from the scope of the invention.

What I claim is—

1. A wheel hub adapted to fit the spindle of an axle comprising a sleeve surrounding the spindle, locking means carried by and secured to the spindle at its outer end wholly within the sleeve and adapted to limit movement of the sleeve in either direction longitudinally of the spindle, the spindle being adapted normally to permit the sleeve to move inwardly from said position, means on said sleeve adapted to engage said first mentioned means to prevent longitudinal movement of the sleeve on the spindle in either direction, said sleeve having a radial opening permitting the release of said locking means, and removable means closing said opening in the sleeve and serving to supply lubricant to said locking means.

2. A wheel hub adapted to fit the spindle of an axle comprising a sleeve surrounding the spindle, a collar carried by the spindle wholly within the sleeve, means for locking the collar against movement longitudinally of the spindle, means on said sleeve adapted to engage the collar and limit movement of the sleeve longitudinally of the spindle in either direction, said sleeve havng a radial opening adapted to permit the release of said collar and withdrawal of said locking means, the spindle being adapted normally to permit the sleeve to move inwardly from said position, and means for closing said opening to permit the retention of lubricant within said sleeve.

3. A wheel hub adapted to fit the spindle of an axle comprising a sleeve surrounding the spindle, a collar carried by the spindle at its outer end wholly within the sleeve, means for locking the collar against movement longitudinally of the spindle, means on said sleeve adapted to engage the opposite sides of the collar to limit movement of the sleeve longitudinally of the spindle in either direction, said sleeve having a radial opening adapted to permit the release of said collar and withdrawal of said locking means, the spindle being adapted normally to permit the sleeve to move inwardly from said position, and means for closing said opening and the end of the sleeve to permit the retention of lubricant within said sleeve.

4. A wheel hub adapted to fit the spindle of an axle comprising a sleeve surrounding the spindle, a collar carried by the spindle at its outer end wholly within the sleeve, means wholly within the sleeve for locking the collar against movement longitudinally of the spindle, means on said sleeve adapted to engage the opposite sides of the collar to limit movement of the sleeve longitudinally of the spindle in either direction, said sleeve having a radial opening adapted to permit the release of said collar and withdrawal of said locking means and the collar, the spindle being adapted normally to permit the sleeve to move inwardly from said position, and means for closing said opening and the end of the sleeve to permit the retention of lubricant within said sleeve.

5. An axle support comprising a wheel hub, a bearing box extending through the hub and secured thereto, a transverse recess in the outer portion of said box, a collar insertible in said recess, an axle journaled in said box and extending through said collar, and means to secure said collar on the axle and a cap on the end of the box.

6. An axle support comprising a wheel hub, a bearing box extending through the wheel hub and secured thereto, the outer end of said box being of greater diameter than the outer end of the hub, a transverse recess in the outer portion of said box, a collar insertible in said recess, an axle journaled in said box and extending through said collar, and means to secure said collar on the axle, and a cap on the end of the box.

7. An axle support comprising a wheel hub, a bearing box extending through the hub and secured thereto, the outer end of said box being of greater diameter than the outer end of the hub, a transverse recess in the outer portion of said box, an opening extending from said recess to the outer surface of the box, a collar insertible in said recess and having diametrically opposed openings, an axle journaled in said box and extending through said collar, an opening transversely of said axle in line with the openings in the collar, and a cotter inserted in the openings in the collar and the shaft to hold the two together, and a cap on the end of the box.

WALTER H. SILVER.